Sept. 17, 1963  R. M. ELSWORTH  3,103,737
PROCESS FOR BINDING COIL END TURNS
OF A DYNAMOELECTRIC MACHINE
Filed May 24, 1961  2 Sheets-Sheet 1

INVENTOR.
ROBERT M. ELSWORTH
BY *James R. Campbell*
ATTORNEY

United States Patent Office 3,103,737
Patented Sept. 17, 1963

3,103,737
PROCESS FOR BINDING COIL END TURNS OF A DYNAMOELECTRIC MACHINE
Robert M. Elsworth, Loudonville, N.Y., assignor to General Electric Company, a corporation of New York
Filed May 24, 1961, Ser. No. 112,356
2 Claims. (Cl. 29—155.5)

The invention described herein relates to dynamoelectric machines and more particularly to an improved process for binding the coil end turns of a motor against displacement.

During operation of a motor, the projecting end turns of coils comprising the winding for the machine, move upon being subjected to magnetic and vibratory forces. If such movement is not restricted, the insulation is abraded from the coil end turn surfaces and in severe cases, short circuit conditions are established which ultimately result in extensive damage to the machine. In order to overcome excessive displacement of the projecting end turns, particularly in form wound coils, the outer exposed surfaces are wrapped peripherally with a multitude of layers of glass roving impregnated with a thermosetting resinous composition. When the treated roving is later cured under the influence of heat, the resulting construction is such that the strength of the concentric ring thus formed is substantially equivalent to that provided by the steel rings previously used.

In alternative constructions, a separately formed insulated steel or non-conductive ring made of glass or other fibrous material, is positioned in the nose formed by the end turns or placed around the outside portions of the end turns, and then secured thereto by resin treated glass strands of relatively short length. During the tying operation, craftsmen have difficulty in making the tie between the ring and end turns sufficiently taut to thereafter preclude loosening of the parts. The tension in the ties however, remains the same after the tying operation is completed. During subsequent motor use, continuous vibration of the end turns sometimes causes the ties to work loose to a slight extent but still in an amount sufficient to cause chafing of the insulation. The use of machines for obtaining a firmer tie between the ring and end turns has been tried but it has been found that if the glass is stressed more than 2½%, rupture of the roving results. It therefore must be applied with lesser degrees of tension and hand tying still appears to be the most attractive method.

Although loosening of the ring from the end turns with resulting abrading of the end turn insulation occurs only in rare instances, it is apparent that the need exists for a construction or improved materials which would completely eliminate the possibility of this adverse action in machines.

The primary object of my invention therefore is to provide an improved process for tying support rings to individual coil end turns of a motor.

Another object of my invention is to provide an improved process for supporting coil end turns so that individual coil end turns of a winding are permitted to deflect slightly when subjected to the severe shocks of starting loads without damaging the coil insulation.

In carrying out my invention, I position a ring preferably comprising a multitude of resin treated glass strands in a braided or unbraided form, or an insulated steel ring, around the outer peripheral portions or in the nose of the coil end turns projecting outwardly from a magnetic core. The ring is then tied to the individual coils comprising the winding with short pieces or ties of polyethylene terephthalate (Dacron) fibrous material to provide a unified mass substantially incapable of movement. When the resin in the Dacron is cured, the latter shrinks to approximately two-thirds of its original length and in doing so, pulls the end turns and ring into very firm engagement with each other. When the machine thereafter is subjected to magnetic and vibratory forces, the tie between the rings and the end turns is of sufficient strength to preclude movement of the end turns with respect to the ring.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawing in which:

Figure 1:
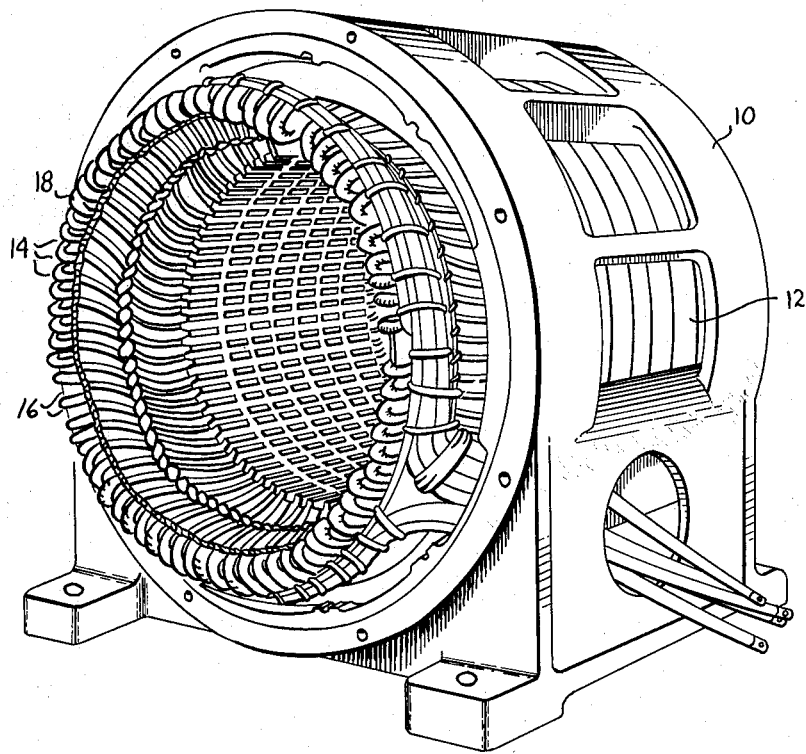
FIGURE 1 is a perspective view of a form wound motor illustrating the disposition of a ring of resin treated glass roving tied to the end turns of coils in a stator.

Referring now to the drawings wherein like reference characters designate like or corresponding parts throughout the several views there is shown in FIGURE 1, a form wound motor comprising a frame 10 enclosing a magnetic core 12 having a multiplicity of coils 14 disposed in slots 16 in the core inner surface. Coil end turns 18 project outwardly from opposite ends of the core in the usual manner. In order to restrict the end turns against displacement when subjected to magnetic and mechanical vibratory forces, a ring of resin treated fibrous material 20 such as glass roving is disposed around the peripheral portions of the end turns. An insulated steel ring also may be used for this purpose. This ring preferably comprises a multiplicity of glass strands loosely assembled together to form a roving which is positioned like a rope on the outer surface of the end turns, or the ring may be formed by wrapping roving around the end turns with a multitude of convolutions. The latter form is particularly effective when the invention is applied to random wound machines in which the winding consists of a multitude of magnet wire conductors, as distinguished from the form wound coils used in larger machines. The loose ends of the roving may be cinched or bonded to the layers therebeneath by the heat of a soldering iron. Roving of this type is the same as that described and claimed in the Coggeshall et al. Patent 2,747,118, which is assigned to the same assignee as the present invention. It generally consists of a loosely constructed body of substantially parallel glass fibers treated with a thermosetting resinous composition.

In the modification shown in FIGURE 3 a similar ring 21, which additionally includes a braided armour covering thereon is placed in the nose of the end turns and then secured thereto as at 26, for preventing subsequent end turn movement in a manner hereinafter described. This ring also is disclosed and claimed more fully in the Pileggi Patent 2,885,581 assigned to the same assignee as the present invention. In both instances, the rings are tied to the end turns by means of small loops 22 which extend over the ring and the end turns to firmly anchor the two together. The constructions described above are well known in the art and have found successful use in many motors operating under widely differing uses and conditions.

Although the constructions described above have performed exceptionally well during operation, it has been found that in rare instances, looseness develops between the end turns and ring, so that the loops used in binding them together no longer serve their intended function.

As a result, these parts are permitted to move with respect to each other with consequent wearing of insulation on the coil end turns and possible damage to the machine. This adverse action is attributable in part to the fact that when the machine is processed through a final heat curing cycle during manufacture, the temperatures used cause relaxation of copper in the complete winding such that the coils seek and obtain new positions of rest in the machine. Since the ties between the ring and end turns initially are made tight, relaxation of some coils tends to create an even tighter bond between the parts. Other end turns however move toward the ring and in those instances where the two have not been drawn tightly together initially, a looseness is established equal to the distance between the end turn and its supporting ring. Neither the glass fibers nor the resin shrinks enough to take up the excess distance thus established. This distance is minute but still sufficient to permit movement when the parts vibrate, so that in time, the insulation is worn off the conductor surface. Deposits of current conducting substances on the coils then establish creepage paths to ground, and when the conductivity reaches a sufficiently high value, flashover or other adverse action occurs to ultimately cause severe damage to the motor.

To overcome these disadvantages, I have found that by using resin treated tie cords or loops 22 capable of shrinking under the influence of heat after the tieing operation is complete, a firm and rigid construction can be obtained during manufacture which thereafter precludes looseness between the end turns and ring. The tie cord or loop material which I prefer to use for this purpose is untreated fibers of polyethylene terephthalate, commonly referred to as Dacron polyester fibrous material. Any fibrous plastic material which is extruded during its manufacture and contains heat shrinkage characteristics and physical properties similar to Dacron is acceptable. The preferred composition used for treating the Dacron roving is the polyester resin described in the above Coggeshall et al. patent, or an epoxy resin consisting of a plasticized boron catalyzed solid resinous system suspended in a solvent. The specific composition used was a Bisphenol A type epichlorohydrin resin with a monoethylamine complex hardener and an epoxy reactive type of flexibilizer agent. Although this specific composition has been used with success, it will be apparent that other varnishes or resins may be employed having the required heat stability and which will delay its setting until the fibrous material has shrunk to its final position.

The tie between each end turn 18 and the ring 20 is made in the usual manner by lacing each cord 22 over the ring and several times around the coil end turns, depending on the size of the roving or cord and the coils being tied. The only tension required to be incorporated in the roving or tie cords is that equivalent to the ordinary tension used in tieing a package. Preferably, the ends are cinched but any securing means may be used such as that of placing the loose end under adjacent sections of roving or bonding the loose end to the roving by means of heat. At that time the resin is in a wet but tack-free state, thus imparting handleability and flexibility characteristics to the roving which readily facilitates making the tie between the ring and end turns.

Figure 3:
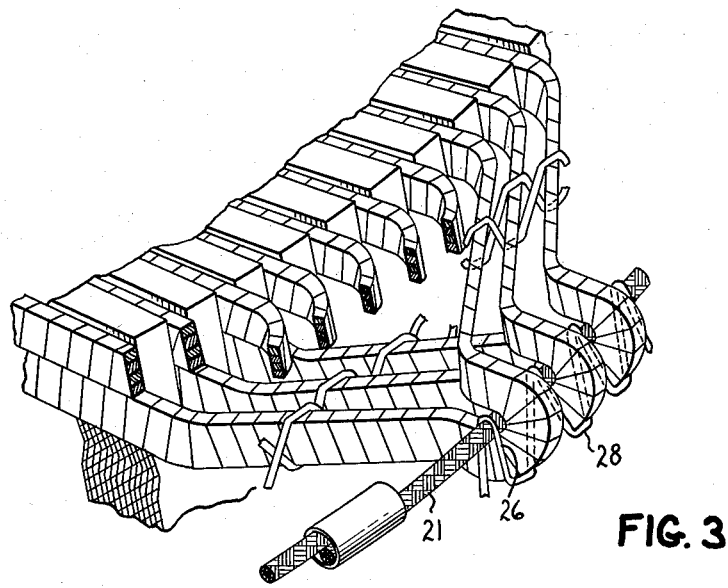
FIGURE 3 illustrates the use of a braided rope secured in the nose of coil end turns by resin treated tie cords.
Figure 2:
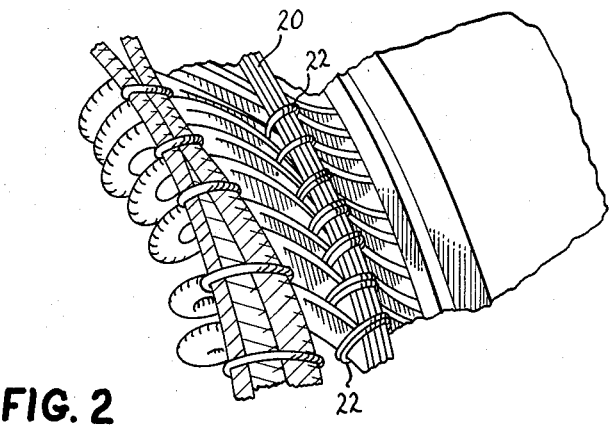
FIGURE 2 is an enlarged view of a portion of the ring and end turns shown in FIGURE 1.

When all of the end turns are secured to the encompassing ring, or the ring in the nose of the end turns as shown in FIGURE 3, the machine is then placed in an oven for curing the varnish which normally is applied to the magnetic core.

The characteristics of the resin chosen for use in the tie cords is such that it also cures at the same temperatures used in the normal manufacturing process. The thermal influences to which the machine is subjected then are sufficient to cause shrinkage of the tie cords and this characteristic is used to advantage in obtaining a firm bond between all end turns and the ring.

As previously indicated, all of the coils comprising the winding and the end turns secured to the ring relax under the influence of heat and seek new positions of rest. The temperatures used during the final heat stage in the manufacturing cycle are compatible with both the temperatures at which the Dacron shrinks and that required to obtain curing of the resin with which the Dacron tie cords or loops are treated. Therefore, the tie cords shrink at the same time that coils are in a relaxed condition, thereby drawing them snugly against the ring. Since the resin starts to cure while the shrinking action is taking place, and continues for a short time thereafter, it coacts with the Dacron fibers to lock all the parts in a rigid preset position so that movement with respect to each other when the machine is placed in operation will not occur. Moreover, the resin serves as an agent effective in bonding the tie cord fibers together and also bonds the complete tie cord to both the end turns and ring.

The specific tie cords found desirable for use in this application is that which is readily available from a manufacturer of the roving. As previously suggested, the product preferably comprises polyethylene terephthalate fibrous material (Dacron) which has not been subjected to heat after being extruded from dies used in its manufacture. At this time, it is capable of shrinking to about 60%–70% of its original length when subjected to controlled amounts of heat. Reliance is placed on this characteristic of the material and its inherent force of recovery properties to draw the end turns and ring into firm engagement with each other.

When the Dacron is received from the manufacturer it normally consists of a single strand comprising a multiplicity of ends wound on a spool in a conventional manner. Since a multitude of strands comprise the roving, a number of spools conveniently can be used from which the strands can be drawn for blending them into a composite mass which comprises the roving.

Since it is necessary to cause complete penetration of the thermosetting resin into the interstitial spaces of adjacent strands, the untreated roving therefore is fed under a roller submerged in a bath of resin. When the roving is pulled from the bath, all excess resin is removed and the product passed through a tower or otherwise heated obtaining partial curing of the resinous composition. It is then packaged in plastic bags for subsequent use.

Although the above description relates to specific resins, any resin may be employed having the following general characteristics. It is essential that the resin be non-tacky to permit factory handling. It should not lose its viscosity characteristics to a substantial degree when heated during the curing cycle because of the necessity of retaining it in the roving to obtain performance of the important function of bonding the individual strands together in the manner described above. Resiliency after curing is desirable in addition to being capable of withstanding temperatures in a range of approximately 155° C. when used in motors or other applications. Neither should it deteriorate with age since a shelf life of at least three months is desirable. It must have good wettable characteristics in addition to being stable from both chemical and moisture standpoints.

When tie cords of the type disclosed above is applied to each end turn and its encompassing ring, it performs two important functions, namely, that of pulling the end turns into a final position of rest and providing an arrangement which will absorb the shock of severe starting currents. As mentioned above, the individual coils comprising the winding move under the influence of heat during a final heat cycling of the machine. Those end turns not in complete contact with the ring are drawn into firm engagement therewith by the Dacron as it attempts to shrink, and at a time when the coils are in a relaxed condition. Since the parts are then set and secured in position at an optimum time, the likelihood of subsequent loosening when vibratory forces are encountered is very remote.

The ability of the tie cords to flex a very slight amount and absorb the forces developed by the coil end turns during periods when heavy starting currents flow through the winding, constitutes an important attribute of the system. Although the complete end turn-ring mass is firmly bound into a unified whole, it displays resilient characteristics which enables it to give under the application of forces tending to move the end turns out of position. Such resiliency is not so great however that an individual coil end turn can move with respect to the ring because to do so would wear away insulation. Rather, large sections of end turns move with the ring and thus eases the stresses and strains to which this part of the motor is subjected during starting.

Although this disclosure has been directed towards the specific application of the use of tie cords or roving in securing coil end turns to an encompassing ring, it will be apparent that it also would have application to a random wound stator for a dynamoelectric machine for example.

In view of the above it will be apparent that many modifications and variations are possible in light of the above teachings. It therefore is to be understood that within the scope of the appended claims the invention may be practiced other than as specifically described.

What I claim as new and desire to secure by Letters Patent of the United States is:

1. A process of manufacturing a magnetic core for a dynamoelectric machine comprising the steps of positioning coils in slots provided in a multitude of stacked laminations, placing a support ring around the end turns projecting outwardly from the core, securing each coil end turn to the support ring by shrinkable resin treated tie cords, subjecting the core with its bound coils to heat, causing simultaneous relaxation of the coils in the slots and shrinkage of the tie cords, drawing all of the end turns into firm engagement with the ring by the reduction in tie cord length resulting from shrinkage which takes place during the application of heat, and curing the resin in the tie cords to form a substantially inflexible connection between the end turns and the ring.

2. A process for manufacturing a magnetic core for a dynamoelectric machine comprising the steps of assembling a multitude of laminations to form a magnetic core and placing coils in slots provided therein, positioning a resin treated ring of substantially parallel glass fibers around the end turns projecting outwardly from the magnetic core, securing each coil end turn to the support ring by resin treated tie cords of shrinkable polyethylene terephthalate fibrous material, subjecting the core with its bound coils to a temperature sufficient to cause simultaneous relaxation of the coils and shrinkage of the polyethylene terephthalate tie cords and curing of the resin, drawing all the end turns into firm engagement with the ring as a result of the application of heat to the tie cords, and curing the resin in the tie cords and ring.

References Cited in the file of this patent

UNITED STATES PATENTS

| | | |
|---|---|---|
| 2,747,118 | Coggeshall et al. | May 22, 1956 |
| 2,885,581 | Pileggi | May 5, 1959 |
| 2,935,859 | Marvin | May 10, 1960 |